(12) United States Patent
Miyajima et al.

(10) Patent No.: US 6,345,844 B1
(45) Date of Patent: Feb. 12, 2002

(54) CONNECTOR

(75) Inventors: Atsuo Miyajima, Inuyama; Kazushige Sakazaki, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/708,019

(22) Filed: Nov. 8, 2000

(30) Foreign Application Priority Data

| Nov. 9, 1999 | (JP) | ............................................. 11-317663 |
| Oct. 20, 2000 | (JP) | ............................................. 12-320246 |

(51) Int. Cl.$^7$ .................. F16L 21/035; F16L 35/00
(52) U.S. Cl. .................. 285/39; 285/374; 285/231; 285/921
(58) Field of Search .................. 285/921, 39, 374, 285/231, 233

(56) References Cited

U.S. PATENT DOCUMENTS

| 2,519,648 | A | * | 8/1950 | Goolsbee | .................. 285/374 |
| 2,996,317 | A | * | 8/1961 | Kibbie et al. | .................. 285/374 |
| 5,067,754 | A | * | 11/1991 | Bartholomew | .................. 285/921 |
| 5,129,685 | A | * | 7/1992 | Engel | .................. 285/231 |
| 5,181,751 | A | * | 1/1993 | Kitamura | .................. 285/921 |
| 5,209,527 | A | * | 5/1993 | Hohmann et al. | .................. 285/921 |
| 5,213,376 | A | * | 5/1993 | Szabo | .................. 285/921 |
| 5,314,214 | A | * | 5/1994 | Highlen et al. | .................. 285/233 |
| 6,086,119 | A | * | 7/2000 | Hansel | .................. 285/921 |

FOREIGN PATENT DOCUMENTS

| IT | 409971 | * | 7/1946 | .................. 285/233 |

* cited by examiner

Primary Examiner—Eric K. Nicholson
(74) Attorney, Agent, or Firm—Oblon, Spivak, McClelland, Maier & Neustadt, P.C.

(57) ABSTRACT

A cylindrical elastomeric sleeve 50 is attached to and held in a receive end portion of a tubular female member 40 made of a resin or a metal. When a tubular male member 30 is inserted, an annular projecting portion 31 of the male member 30 is engaged with an engagement inner peripheral groove 56 while a diameter of a swelling portion 53 of the elastomeric sleeve 50 is increased in a first diameter portion 41 of the female member 40. A portion between the male member 30 and the female member 40 is sealed by a seal portion 54 at the other end side of the elastomeric sleeve 50 received in a second diameter portion 43 of the female member 40.

10 Claims, 6 Drawing Sheets

CONNECTOR

BACKGROUND OF THE INVENTION

The present invention relates to a connector for connecting tubes, for example a connector for connecting a resin tube and a metal pipe to each other in order to transfer various fluids such as fuel, oil, water or air.

Conventionally, there have been known various connectors for mutually coupling various hoses, pipes and the like of automobiles. FIG. 12 shows one of typical examples. The connector comprises a tubular male member 10 such as a metallic pipe, a cylindrical housing member 20 having a large diameter portion for receiving an end of the male member 10 at one of ends and a tube inserting portion 21 for inserting a resin tube or the like at the other end and an engagement member 25 for being inserted from an opening at one of the ends of the housing member 20 and engaged with the housing member 20 and serving to engage an annular projecting portion 11 of the male member 10 to be coupled to the housing member 20, and furthermore, an annular seal member 12 such as an O ring for sealing a portion between the inner periphery of the central part of the housing member 20 and the outer peripheral surface of the male member 10, and an annular bush 13 and a collar 14 which serve to hold the seal member 12 in a predetermined position.

In the connector of this kind, the engagement member 25 is constituted by a deformable portion and a non-deformable portion and elastic deformation can be carried out by cutting out at least one portion in an axial direction. Accordingly, the engagement member 25 is inserted into the housing member 20 with a reduction in a diameter and an engagement portion 26 is snapped into a window portion 22 provided in the housing member 20. In the engagement member 25 engaged with the housing member 20, a non-deformable portion 25a extending diagonally in a radial direction is snapped into an annular projecting portion 11 of the male member 10 through the deformable portion so that the male member 10 can be coupled to the housing member 20. Moreover, a pair of operation arms 27 are provided integrally with one of ends of the engagement member 25. By pushing the operation arm portion 27 inward radially to reduce the whole diameter, the male member 10 can be removed from the engagement member 25 and the housing member 20.

In a connecting structure using the conventional connector, the number of parts is so large that a reduction in a cost is limited and a whole axial length is so great that a reduction in a size is difficult. More specifically, as shown in FIG. 12, it is necessary to receive the almost cylindrical engagement member 25 having the operation arm portion 27 and the bush 13 in the housing member 20 and to engage and connect the annular projecting portion 11 of the male member 10 inserted from the opening at one of the ends of the housing member 20 with the other end of the engagement member 25. Therefore, the whole length of the connector portion in the axial direction is necessarily very great.

Moreover, GB2022727A has disclosed a connection structure in which a male member (fuel injection nozzle) is inserted and fastened into a bore of an inlet portion of a female member through an elastomeric sleeve. The elastomeric sleeve comprises a bead portion including, on one of ends, an outward projecting portion which projects outward radially and an inward projecting portion which projects inward radially, and on the other end, an introducing end portion including a rib projecting inward radially. Furthermore, the male member comprises, on the insertion end, an engaging outer peripheral groove to be engaged with the radial projecting portion and the female member comprises, on the inner peripheral surface of the bore, an annular groove to be engaged with the outward projecting portion. The thickness of the wall of the bead portion in the elastomeric sleeve is slightly greater than that of a clearance formed by the engagement outer peripheral groove and the annular groove. Moreover, the thickness of the rib on the introducing end portion of the elastomeric sleeve is greater than a clearance formed by the male member and the bore corresponding thereto. With the connection structure for the fuel injection nozzle, accordingly, the male member is pressed into the bore of the inlet portion of the female member so that the male member can be fastened into the bore of the inlet portion of the female member through the bead portion of the elastomeric sleeve and can be sealed through the rib formed in the introducing end portion of the elastomeric sleeve.

With such a connection structure, it is necessary to cause the thickness of the bead portion to be much greater than the above stated clearance in order to strongly fasten the male member into the bore of the inlet portion of the female member through the bead portion of the elastomeric sleeve. After the elastomeric sleeve is previously assembled into the engagement outer peripheral groove of the male member, the male member should be inserted into the bore of the inlet portion of the female member and the bead portion of the elastomeric sleeve should be surely engaged so as not to get out of the annular groove. However, it is hard to sense whether both are surely engaged or not. If both are incompletely engaged, both might get out from each other during use and the male member should be inserted by a comparatively strong force. Moreover, it is difficult to easily remove the male member from the female member. Furthermore, the elastomeric sleeve should be assembled into the engagement outer peripheral groove of the male member in advance. For this reason, there is a danger that the exposed elastomeric sleeve might be damaged before the insertion in the female member.

SUMMARY OF THE INVENTION

In consideration of the conventional circumstances, it is a first object of the present invention to provide a connector capable of decreasing the number of parts to reduce a cost and to obtain a smaller size in an axial direction, and of preventing a seal member from being damaged, thereby easily and surely connecting a male member to a female member without requiring a great inserting force. Preferably, it is a second object of the present invention to provide a connector capable of easily removing the male member from the female member by means of a release tool.

In order to achieve the above-mentioned objects, the present invention provides a connector in which a tubular male member is fastened together with a tubular female member by a cylindrical elastomeric sleeve held in a receive bore of a cylindrical receive end portion formed on one end of said tubular female member, characterized in that the tubular male member includes an insert end portion having a cylindrical tip end portion and an annular projecting portion that is located behind and adjacent to the tip end portion, the cylindrical elastomeric sleeve is provided at its one end with a cylindrical swelling portion having an annular engagement inner peripheral groove adapted to receive the annular projecting portion by snapping the annular projecting portion of the male member, and the cylindrical elastomeric sleeve is provided at the other end with a cylindrical seal portion which is adjacent to the swelling portion and which has an inner periphery that liquid-tightly engages an outer peripheral surface of the tip portion of the tubular male member, the tubular female member is provided at its one end of the received end portion with a first diameter portion having a first bore having a larger inner diameter than the outer diameter of the cylindrical seal portion of said elastomeric sleeve for receiving the swelling portion, an entrance of the first diameter portion includes an annular restriction rib that is projected radially inward from an inner peripheral surface of the first diameter portion, the annular restriction rib having an inner diameter slightly larger than an outer diameter of the annular projecting portion of the tubular male member and the annular restriction rib engaging an outer surface of one end of the swelling portion of the cylindrical elastomeric sleeve when a pulling-out force is applied between the tubular male member and the tubular female member, and the receive end portion is provided at the other end with a second diameter portion having a second bore adapted to receive the cylindrical seal portion, and the first bore of the first diameter portion is provided therein with space capable of spreading a diameter of the cylindrical swelling portion of the elastomeric sleeve between the first diameter portion and the swelling portion in order to snap the annular projecting portion of the tubular male member into the engagement inner peripheral groove of the swelling portion.

Moreover, the connector according to the present invention is characterized in that the second diameter portion of the tubular female member includes a step portion for restricting a movement of the cylindrical elastomeric sleeve toward the other end side thereof, and that the tubular female member is integrally formed of a metal tube having a constant thickness and that the annular restriction rib formed on the inlet of the first diameter portion of the tubular female member includes a reinforcing portion extending outward radially.

Furthermore, the connector according to the present invention is characterized in that one end of the engagement inner peripheral groove formed on the swelling portion of the cylindrical elastomeric sleeve includes an annular lock surface that engages with the annular projecting portion of inserted the tubular male member, and in order to form the annular lock surface, one end opening of the cylindrical swelling portion includes a thick walled portion, and an inner peripheral surface of the thick walled portion is formed as a guide surface whose diameter is gradually reduced toward the other end of said engagement inner peripheral groove.

Furthermore, in the connector according to the present invention, the cylindrical elastomeric sleeve is made of material having different characteristic and includes a first region comprising the cylindrical swelling portion and one end of the cylindrical seal portion located adjacent to the swelling portion, and a second region comprising the other end of the cylindrical seal portion located adjacent to one end of the swelling portion, the first and second regions are determined by a different of said material, the first region comprises an elastomer having excellent sealing ability at a low temperature and the second region comprises a low fuel permeable elastomer, or the first region comprises a low fuel permeable elastomer and the second region comprises an elastomer having excellent sealing ability at a low temperature, Furthermore, in the connector according to the present invention, the elastomer having excellent sealing ability at a low temperature is one of NBR (nitrile rubber), FVMQ (Fluoro silicon rubber)and NBR.PVC (mixture of nitrile rubber and vinyl chloride), and said low fuel permeable elastomer is FKM (Fluoro elastomer) ,and the engagement inner peripheral groove formed on the swelling portion of the elastomeric sleeve may be formed into a channel-like shape.

According to the present invention, in the connection of the female member and the male member, the engagement function for connecting the male member to the female member and the cylindrical elastomeric sleeve attached to and held in the female member and the seal function for the seal member are shared. Consequently, the structure is simplified and the number of parts is decreased so that a cost can be reduced. In addition, the cylindrical elastomeric sleeve has the engagement inner peripheral groove for snapping the annular projecting portion of the male member into one end side, while the receive end portion of the female member has a space capable of increasing the diameter of the swelling portion between the first diameter portion and the swelling portion of the elastomeric sleeve in the first bore. Therefore, when the male member is to be connected to the female member, the annular projecting portion can be fastened easily and reliably into the engagement inner peripheral groove without requiring a strong inserting force.

Furthermore, since the cylindrical elastomeric sleeve in the connector according to the present invention is previously attached to and held in the female member, it is not damaged and a portion between the female member and the male member can be sealed surely. Moreover, the insertion and attachment of the bush and the collar for preventing the movement of the elastomeric sleeve can be omitted. In addition, in the connector according to the present invention, the number of coupling portions of the female member and the male member can be decreased so that reliability for a sealing ability can be enhanced still more. In a preferred embodiment, furthermore, a thick walled portion is provided on the opening at one end of the swelling portion of the cylindrical elastomeric sleeve and the inner peripheral surface of the thick walled portion includes a guide surface having a diameter gradually reduced toward the other end side. Therefore, the male member can be fastened more easily and can be released readily by using a release tool.

The above and further objects and features of the invention will more fully be apparent from the following detailed description with accompanying drawings.

DESCRIPTION OF THE PREFERRED EMBODIMENTS

A connector according to the present invention does not include an independent seal member, a bush for holding the seal member and the like in the conventional connector having a large number of parts and a complicated structure (see FIG. 8) but has a structure where a cylindrical elastomeric sleeve attached to and held in a female member is caused to have an engagement function for connecting a male member and a seal function for the seal member. A resin tube or the like is connected to the male member by press of the outer periphery at the other end side into the female member.

Figure 1:
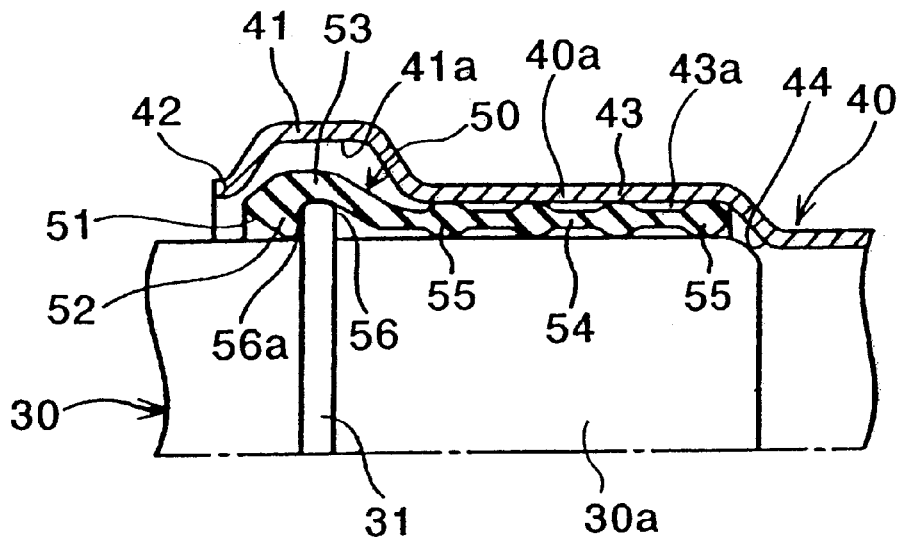
FIG. 1 is a schematic side view showing a specific example of a connector according to the present invention, which is partially take away.

A specific example of the connector according to the present invention will be described in detail with reference to FIGS. 1 to 5. First of all, a male member 30 may be an ordinary metal tube, and includes an insert end portion having a tip portion 30a extending straightly and an annular projecting portion 31 projecting outward radially from an outer peripheral surface adjacently to the rear part of the tip portion 30a as shown in FIG. 1. The annular projecting portion 31 may be bead-shaped as shown and a tapered surface can also be provided at the tip portion 30a side to facilitate insertion.

Figure 2:
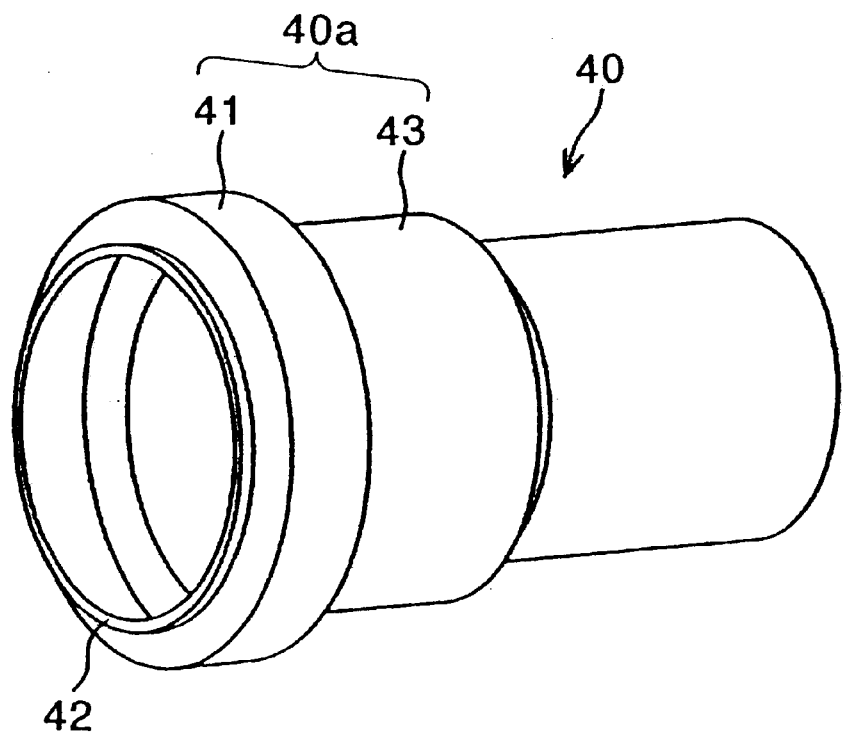
FIG. 2 is a schematic perspective view showing a specific example of a female member according to the present invention.

A female member 40 is formed of a resin, a metal or a metal having an outer periphery coated with a resin, and preferably, is formed integrally with a metal tube having a constant thickness. The female member 40 includes a first diameter portion 41 having a diameter increased outward radially to have a first bore 41a for receiving a swelling portion 53 of an elastomeric sleeve 50 described later at one end side of a receive end portion 40a as shown in FIGS. 1 and 2, and a second diameter portion 43 having a second bore 43a suitable for receiving a cylindrical seal portion 54 of the elastomeric sleeve 50 at the other end side of the receive end portion 40a. The first bore 41a in the first diameter portion 41 of the female member 40 has a space capable of increasing the diameter of the swelling portion 53 between the swelling portion 53 of the elastomeric sleeve 50 which is inserted and held and the first diameter portion 41. Accordingly, the first diameter portion 41 has an inner diameter much greater than the outer diameter of the seal portion 54.

The first diameter portion 41 of the female member 40 includes, at an inlet thereof, an annular restriction rib 42 having an inner diameter slightly larger than the outer diameter of the annular projecting portion 31 of the male member 30 and projecting inward radially. When a pulling-out force is applied between the male member 10 and the female member 40, an inclined inner surface formed by the restriction rib 42 abuts on and is engaged with an outer surface at one end of the swelling portion 53 of the elastomeric sleeve 50 so that the male member can be prevented from slipping off from the female member and the diameter of the swelling portion 53 of the elastomeric sleeve 50 can be prevented from being increased. Moreover, the second diameter portion 43 of the female member 40 has, at the other end side, a step portion 44 for restricting a movement to the other end side of the elastomeric sleeve 50.

Figure 3:
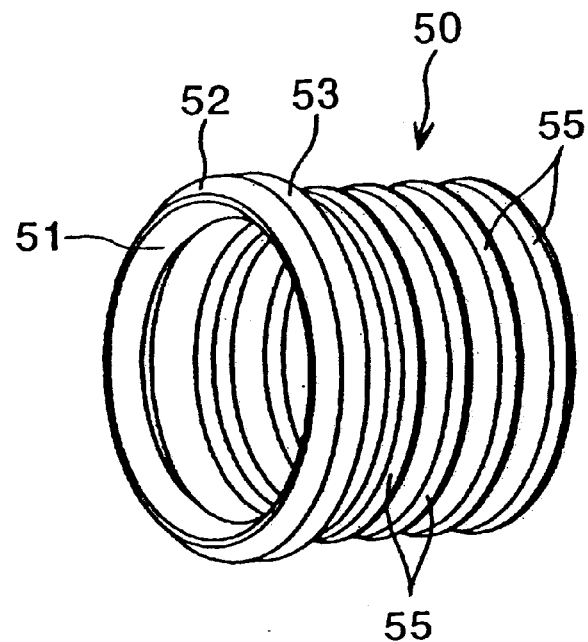
FIG. 3 is a schematic perspective view showing a specific example of a cylindrical elastomeric sleeve according to the present invention.

The cylindrical elastomeric sleeve 50 is formed of an elastomeric deformable material such as NBR PVC (a mixture of nitrile rubber and polyvinyl chloride) and is received and held in the receive end portion 40a of the tubular female member 40 as shown in FIGS. 1 and 3. At one end side of the elastomeric sleeve 50 is provided the cylindrical swelling portion 53 having an annular engagement inner peripheral groove 56 suitable for snapping the annular projecting portion 31 of the tubular male member 30 and for receiving the annular projecting portion 31. A cylindrical seal portion 54 having an inner peripheral surface to be engaged liquid-tightly with the outer peripheral surface of the tip portion 30a of the male member 30 is provided at the other end side extending adjacently to the swelling portion 53 of the elastomeric sleeve 50. The outer peripheral part of the seal portion 54 is engaged liquid-tightly with the inner peripheral surface of the second diameter portion 43 of the receive end portion 40a. The inner diameter of the engagement inner peripheral groove 56 provided in the swelling portion 53 of the elastomeric sleeve 50 is greater than that of the seal portion 54.

The engagement inner peripheral groove 56 formed on the swelling portion 53 of the elastomeric sleeve 50 has an annular lock surface 56a at one end side which is engaged with the annular projecting portion 31 of the inserted male member 30 to prevent the male member 30 from being pulled out. In order to form the lock surface 56a, a thick walled portion 52 is provided on an opening at one end of the swelling portion 53. The inner peripheral surface of the thick walled portion 52 can be formed to be a guide surface 51 having a diameter gradually reduced toward the other end side.

Figure 4:
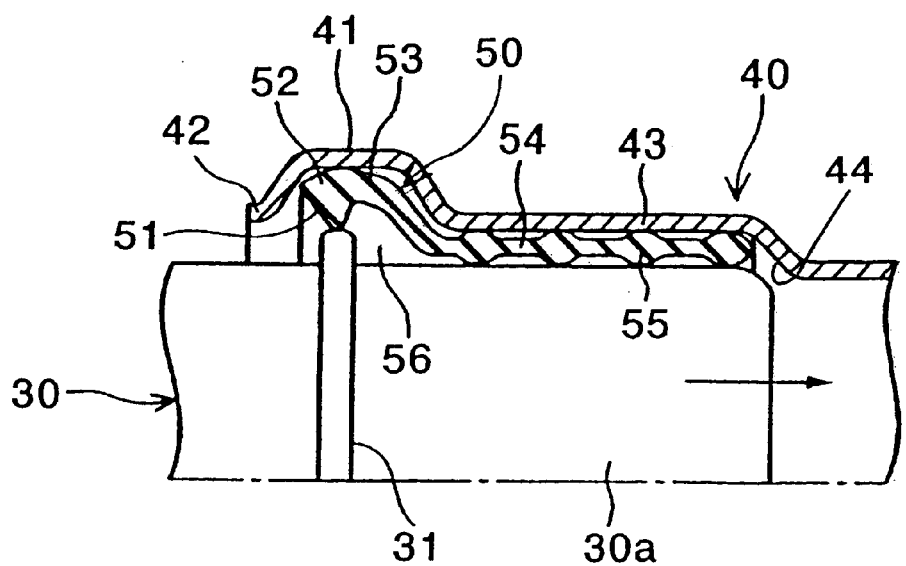
FIG. 4 is a schematic side view showing the state of a connector during connection according to the present invention, which is partially taken away.

When the male member 30 is to be connected to the female member 40, the cylindrical elastomeric sleeve 50 is first fitted from the opening at one end of the receive end portion 40a of the female member 40 to position the swelling portion 53 of the elastomeric sleeve 50 in the first bore 41a of the first diameter portion 41 and to receive the seal portion 54 of the elastomeric sleeve 50 along the inner peripheral surface of the second diameter portion 43. When the insert end portion of the male member 30 is inserted from the opening at one end of the receive end portion 40a into the female member 40 attaching and holding the cylindrical elastomeric sleeve 50 therein, the annular projecting portion 31 enters while pushing the thick walled portion 52 and the swelling portion 53 of the elastomeric sleeve 50 outward radially along the guide surface 51, thereby increasing a diameter as shown in FIG. 4. When the male member 30 is to be inserted, the elastomeric sleeve 50 is not pushed into the other end side because the other end of the seal portion 54 abuts on the step portion 44 of the female member 40.

Figure 5:
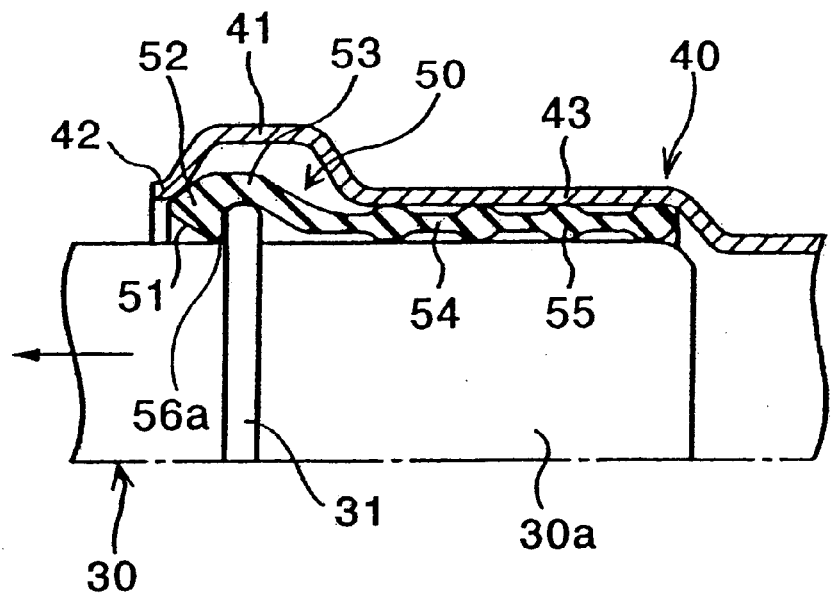
FIG. 5 is a schematic side view showing the state of the connector during engagement according to the present invention, which is partially taken away.

In the male member 30 thus inserted in the female member 40, the annular projecting portion 31 is fitted in and engaged with the engagement inner peripheral groove 56 provided on the inside of the swelling portion 53 of the elastomeric sleeve 50 as shown in FIG. 1. At the same time, the swelling portion 53 of the elastomeric sleeve 50 is received in the first bore 41a provided in the first diameter portion 41 of the female member 40. For this reason, even if a pulling-out force is applied to the male member 30 in a direction of an arrow as shown in FIG. 5, the annular projecting portion 31 abuts on the annular lock surface 56a of the engagement inner peripheral groove 56 of the elastomeric sleeve 50 and the swelling portion 53 of the elastomeric sleeve 50 abuts on and is engaged with the restriction rib 42 of the female member 40 provided on the outside. Therefore, the male member 30 cannot be pulled out so that a connection state can be maintained.

Moreover, the sealing ability of the connector is maintained by the seal portion 54 of the cylindrical elastomeric sleeve 50 interposed between the insert end portion 30a of the male member 30 and the second diameter portion 43 extending from the first diameter portion 41 of the female member 40 to the other end side. In order to further enhance the sealing ability of the elastomeric sleeve 50, a plurality of annular link portions 55 can be provided on the seal portion 54 at a proper interval. The sectional shape of the annular link portion 55 is not particularly restricted but may be spherical as shown, triangular, rectangular or the like.

Figure 6:
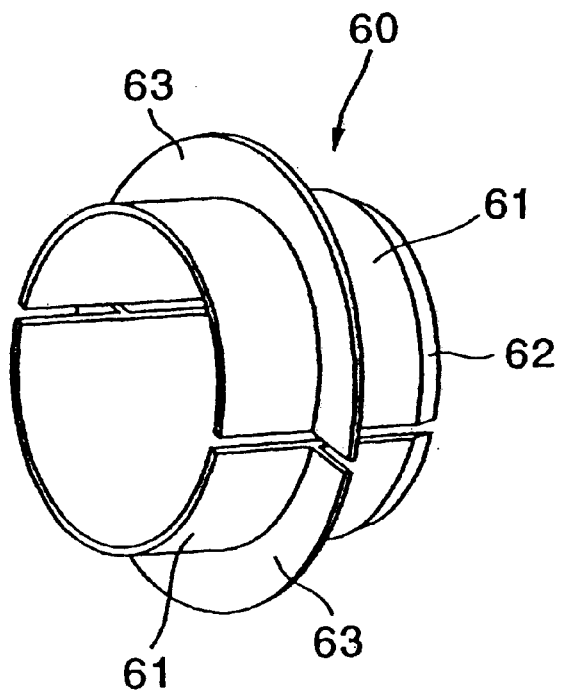
FIG. 6 is a schematic perspective view showing a specific example of a release tool to be used for releasing the connection of the connector according to the present invention.
Figure 7:
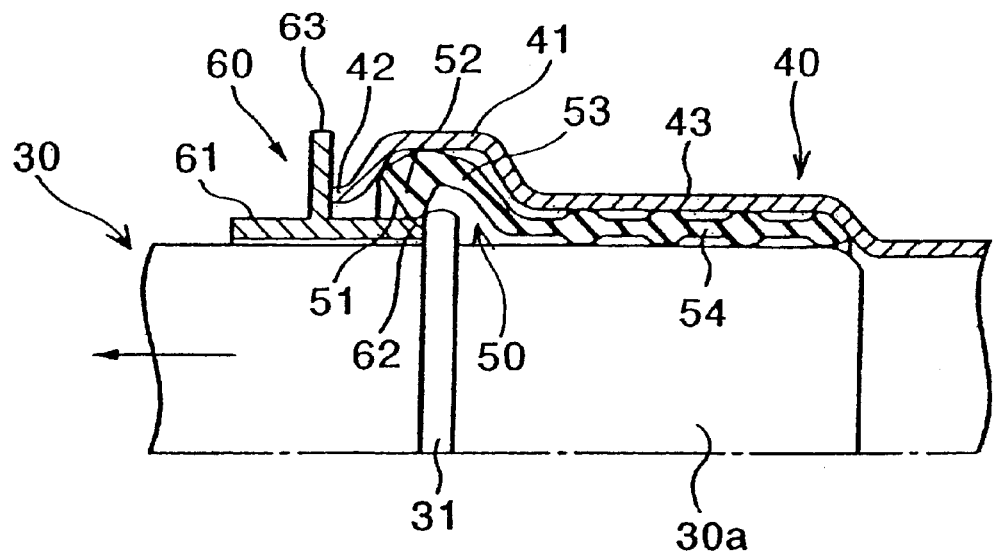
FIG. 7 is a schematic side view showing the state in which a male member is pulled out of the connector according to the present invention, which is partially taken away.

In the case in which the male member 30 is to be removed from the connected connector as described above, a release tool 60 including cylindrical members 61 axially divided into two portions is used as shown in FIG. 6. As shown in FIG. 7, when each of the two-divided cylindrical members 61 of the release tool 60 is fitted in the outer periphery of the male member 30 and a flange portion 63 is pushed to insert a tip having a tapered surface 62 of the cylindrical member 61 from the opening on one end of the receive end portion 40a of the female member 40 to the inside, the tapered surface 62 on the tip pushes up the swelling portion 53 outward radially in the first bore 41a of the first diameter portion 41 of the female member 40 together with the thick walled portion 52 while the tapered surface 62 on the tip enters along the guide surface 51 of the elastomeric sleeve 50. At this time, the diameter of the inner peripheral end of the guide surface 51 of the elastomeric sleeve 50 is increased outward from the outer peripheral end of the annular projecting portion 31 of the male member 30. Therefore, the male member 30 can be pulled out toward one end side (in a direction of an arrow in FIG. 7).

Figure 8:
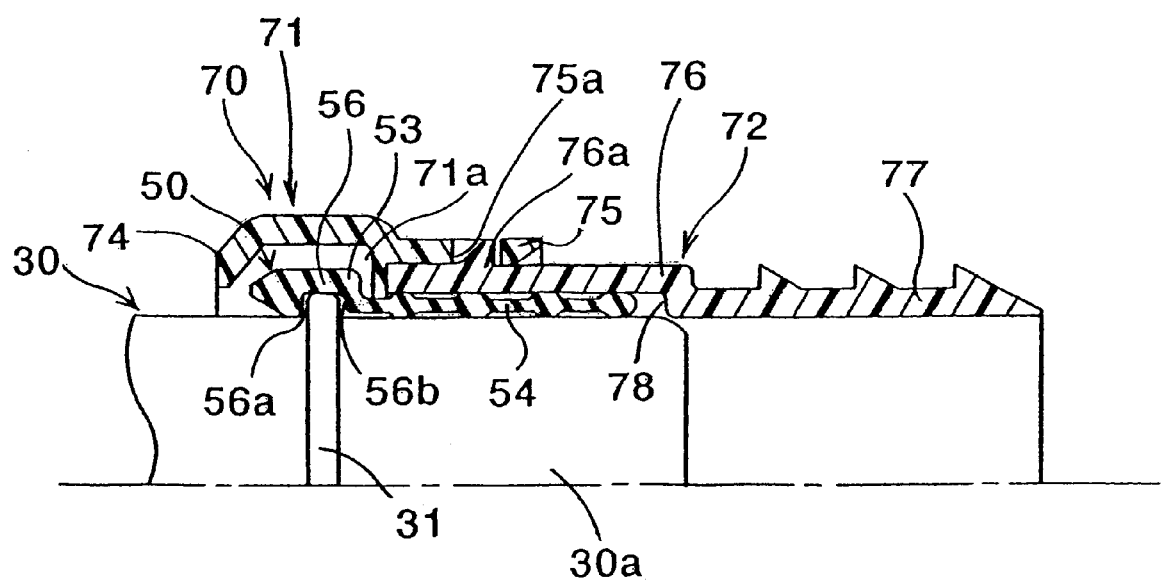
FIG. 8 is a schematic side view showing another specific example of the connector according to the present invention, which is partially taken away.
Figure 9:
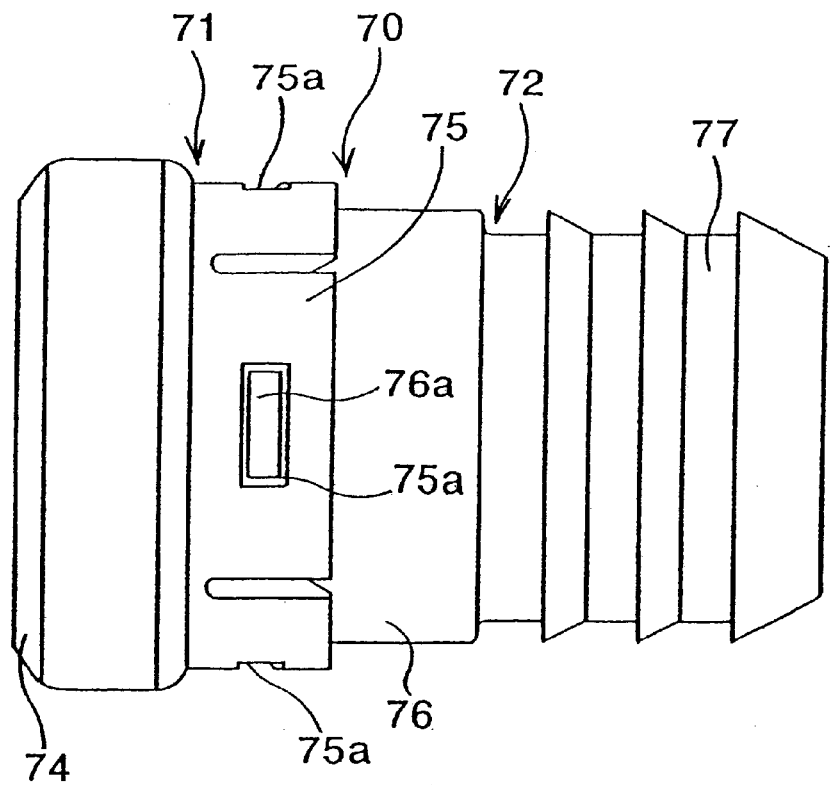
FIG. 9 is aside view showing the connector of FIG. 8.

Another specific example of the connector according to the present invention is shown in FIGS. 8 and 9. In the connector according to the specific example, a female member 70 is formed of a resin such as polyamide and is constituted by a first diameter member 71 and a second diameter member 72 which are separated from each other. More specifically, the cylindrical first diameter member 71 includes a first bore 71a for receiving and holding a swelling portion 53 of an elastomeric sleeve 50 in the same manner as that in the above-mentioned specific example (see FIGS. 1 to 5), and has a restriction rib 74 at one end side and an engagement peripheral wall portion 75 at the other end side. The engagement peripheral wall portion 75 is provided with a plurality of engagement bores 75a circumferentially at regular intervals.

On the other hand, in the cylindrical second diameter member 72, a plurality of engagement clicks 76a are protruded from the outer peripheral surface of a cylindrical wall 76 at one end side circumferentially at regular intervals and a nipple portion 77 for pressing and connecting a resin tube or the like is provided at the other end side. When the cylindrical wall 76 of the second diameter member 72 is inserted into the engagement peripheral wall portion 75 of the first diameter member 71, the engagement click 76a provided on the cylindrical wall 76 is engaged with the engagement bore 75a of the engagement peripheral wall 75 so that the first diameter member 71 and the second diameter member 72 are coupled coaxially.

In the connector according to the specific example, other portions are substantially similar to the above-mentioned specific example except that the female member 70 is constituted by the first diameter member 71 and the second diameter member 72 which are separated from each other as described above. As is apparent from FIG. 8, in the specific example, the engagement inner peripheral groove 56 of the cylindrical elastomeric sleeve 50 is formed like a channel and both a lock surface 56a at one end side of the engagement inner peripheral groove 56 and a stopper surface 56b at the other end side are almost axially perpendicular. By the stopper surface 56b of the engagement inner peripheral groove 56, the annular projecting portion 31 of the male member 30 which is inserted abuts so that the male member 30 can be positioned more accurately. Moreover, a step 78 for preventing the push-in of the elastomeric sleeve 50 is formed on an inner peripheral surface between the cylindrical wall 76 of the second diameter member 72 and the nipple portion 77.

Figure 10:
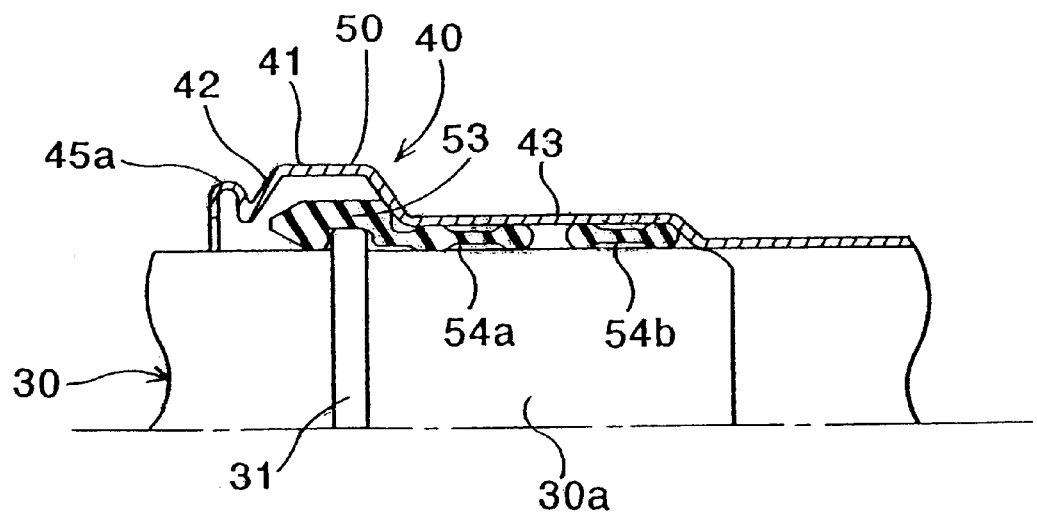
FIG. 10 is a schematic side view showing yet another specific example of the connector according to the present invention, which is partially taken away, FIG. 11 a schematic side view showing a further specific example of the connector according to the present invention, which is partially taken away.
Figure 11:
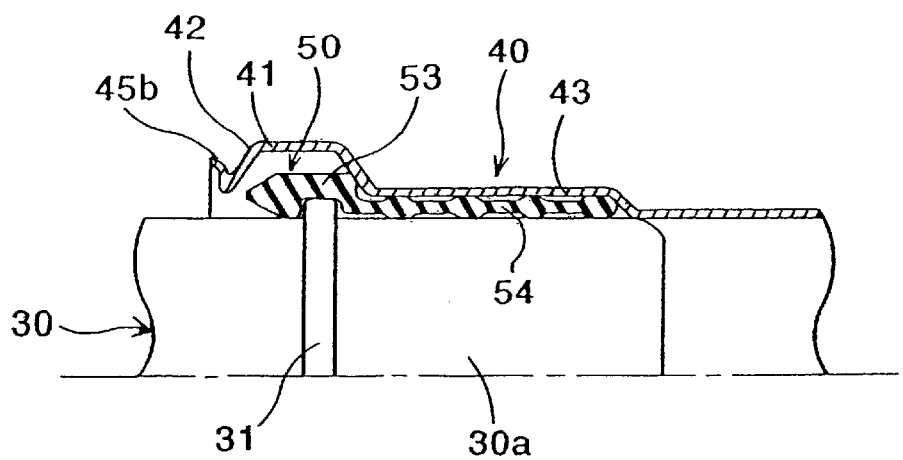
Figure 12:
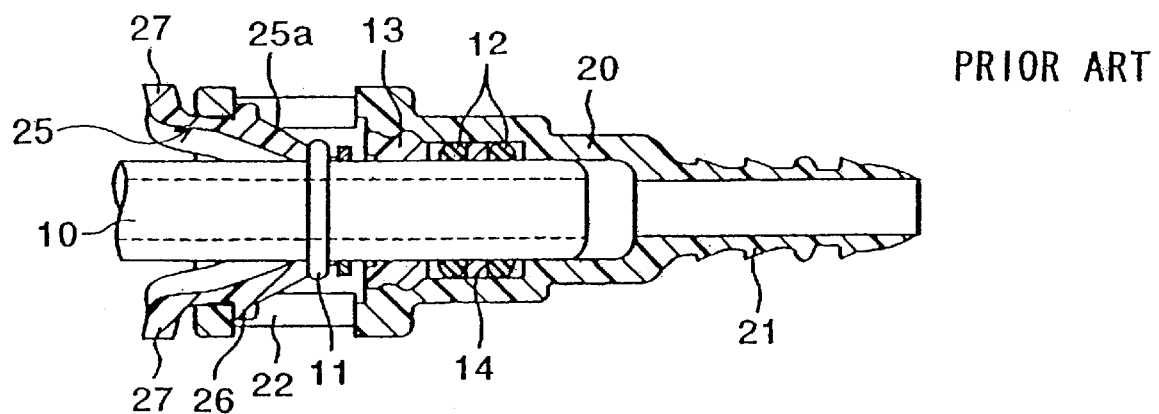
FIG. 12 is a schematic side view showing an example of a conventional connector, which is partially taken away.

In the connector according to the present invention, a reinforcing portion 45a or 45b extending outward radially from the annular restriction rib 42 can be provided on one end of the tubular female member 40 as shown in FIGS. 10 and 11. By providing the reinforcing portion 45a or 45b, even if an excessive pulling-out force is applied to the male member 30 connected to the female member 40, it is possible to prevent the receive end portion 42 of the female member 40 from spreading to pull out the male member 30 therefrom. The shape of the reinforcing portion is not restricted to that in FIGS. 10 and 11.

The cylindrical elastomeric sleeve 50 according to the present invention is usually formed of one kind of material as a whole and can also be constituted by a first region having a cylindrical swelling portion 53 and one end side of a cylindrical seal portion 54 adjacent to the swelling portion 53 and a second region having the other end side of the cylindrical seal portion 54 adjacent to the one end side of the seal portion 54 which are formed of materials different from each other. In this case, the first and second regions of the elastomeric sleeve 50 can also be formed integrally through adhesion or the like. Moreover, a first region 54a and a second region 54b may be formed separately as shown in FIG. 10 and may be separated and arranged in the second bore 43a in the second diameter portion 43 of the female member 40.

In the case in which the cylindrical elastomeric sleeve 50 is divided into two regions which are formed of materials having different properties from each other, the first region may be formed of rubber or elastomer having an excellent sealing ability at a low temperature, while the second region may be formed of rubber or elastomer having low gasoline transparency. Alternatively, the first region may be formed of rubber or elastomer having low gasoline transparency, while the second region may be formed of rubber or elastomer having an excellent seal ability at a low temperature. It is preferable that one kind selected from NBR (nitrile rubber), NBR.PVC (a mixture of nitrile rubber and polyvinyl chloride) and FVMQ (Fluoro silicone rubber) should be used for the rubber or elastomer having an excellent sealing ability at a low temperature. Moreover, FKM (Fluoro elastomer) is preferable for the rubber or elastomer having a gasoline transparent resistance.

In the connector according to the present invention, the male member and the female member can be connected by using the cylindrical elastomeric sleeve attached to and held in the receive end portion of the female member, and a resin tube or the like can be connected to the other end side of the female member. The cylindrical elastomeric sleeve can reliably seal the portion between the male member and the female member, and furthermore, cooperates with the female member to function as an engagement member for the male member. Accordingly, it is not necessary to use a seal member such as an ordinary O ring, or a bush or a collar which is to be provided for holding the seal member. Thus, the number of parts can be reduced.

In the connector according to the present invention, the mechanism in which the female member and the cylindrical elastomeric sleeve cooperate to engage the male member has a first characteristic. Therefore, portions other than the portions related to the engagement mechanism are not restricted to the above-mentioned specific examples. For example, while the second diameter portion 43 of the female member 40 has the inner diameter of the portion extending toward the other end side (the nipple portion for connecting the resin tube or the like) which is almost equal to the outer diameter of the tip portion 30a of the insert end portion of the male member 30 in the above-mentioned specific examples, the portion extending toward the other end side may extend as a cylindrical portion having a constant inner diameter or may also have the inner diameter further reduced to be smaller than the outer diameter of the tip portion 30a of the male member 30.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A connector in which a tubular male member is fastened together with a tubular female member by a cylindrical elastomeric sleeve held in a receive bore of a cylindrical receive end portion formed on one end of said tubular female member, characterized in that said tubular male member includes an insert end portion having a cylindrical tip end portion and an annular projecting portion that is located behind and adjacent to the tip end portion, said cylindrical elastomeric sleeve is provided at its one end with a cylindrical swelling portion having an annular engagement inner peripheral groove adapted to receive said annular projecting portion by snapping said annular projecting portion of said male member, and said cylindrical elastomeric sleeve is provided at the other end with a cylindrical seal portion which is adjacent to the swelling portion and which has an inner periphery that liquid-tightly engages an outer peripheral surface of the tip portion of said tubular male member, said tubular female member is provided at its one end of the received end portion with a first diameter portion having a first bore having a larger inner diameter than the outer diameter of the cylindrical seal portion of said elastomeric sleeve for receiving the swelling portion, an entrance of the first diameter portion includes an annular restriction rib that is projected radially inward from an inner peripheral surface of the first diameter portion, the annular restriction rib having an inner diameter slightly larger than an outer diameter of the annular projecting portion of said tubular male member and the annular restriction rib engaging an outer surface of one end of the swelling portion of said cylindrical elastomeric sleeve when a pulling-out force is applied between said tubular male member and said tubular female member, and the received end portion is provided at the other end with a second diameter portion having a second bore adapted to receive the cylindrical seal portion, and said first bore of said first diameter portion is provided therein with space capable of spreading a diameter of the cylindrical swelling portion of said elastomeric sleeve between the first diameter portion and the swelling portion in order to snap the annular projecting portion of said tubular male member into the engagement inner peripheral groove of the swelling portion.

2. A connector according to claim 1, wherein said second diameter portion of said tubular female member includes a step portion for restricting a movement of said cylindrical elastomeric sleeve toward said other end thereof.

3. A connector according to claim 1, wherein said tubular female member is formed of thin walled metal tube as one piece.

4. A connector according to claim 3, wherein said annular restriction rib formed on an entrance of the first diameter portion of said tubular female member includes a reinforcing portion extending radially outward.

5. A connector according to claim 1, wherein one end of said engagement inner peripheral groove formed on the swelling portion of said cylindrical elastomeric sleeve includes an annular lock surface that engages with said annular projecting portion of inserted said tubular male member, and in order to form said annular lock surface, one end opening of the cylindrical swelling portion includes a thick walled portion, and an inner peripheral surface of the thick walled portion is formed as a guide surface whose diameter is gradually reduced toward the other end of said engagement inner peripheral groove.

6. A connector according to claim 1, wherein said cylindrical elastomeric sleeve is made of material having different characteristic and includes a first region comprising said cylindrical swelling portion and one end of said cylindrical seal portion located adjacent to said swelling portion, and a second region comprising the other end of said cylindrical seal portion located adjacent to one end of said swelling portion, said first and second regions are determined by a difference of said material, said first region comprises an elastomer having excellent sealing ability at a low temperature and said second region comprises a low fuel permeable elastomer, or said first region comprises a low fuel permeable elastomer and said second region comprises an elastomer having excellent sealing ability at a low temperature.

7. A connector according to claim 6, wherein said first region and said second region are integrally formed together.

8. A connector according to claim 6, wherein said first region and said second region are independent and separated from each other.

9. A connector according to claim 6, wherein said elastomer having excellent sealing ability at a low temperature is one of NBR (nitrile rubber), FVMQ (Fluoro silicon rubber) and NBR.PVC (mixture of nitrile rubber and vinyl chloride), and said low fuel permeable elastomer is FKM (Fluoro elastomer).

10. A connector according to claim 1, wherein said engagement inner peripheral groove formed on the swelling portion of said elastomeric sleeve is formed into a channel shape.

* * * * *

UNITED STATES PATENT AND TRADEMARK OFFICE
CERTIFICATE OF CORRECTION

| | |
|---|---|
| PATENT NO. | : 6,345,844 B1 |
| DATED | : February 12, 2002 |
| INVENTOR(S) | : Miyajima et al. |

It is certified that error appears in the above-identified patent and that said Letters Patent is hereby corrected as shown below:

<u>Title page,</u>
Item [30], the Foreign Application Priority information should read:

-- [30]  Foreign Application Priority Data
Nov. 9, 1999     (JP) …………………….. 11-317663
Oct. 20, 2000   (JP) ………………….. 2000-320246 --

Signed and Sealed this

Seventeenth Day of September, 2002

*Attest:*

JAMES E. ROGAN
*Attesting Officer*     *Director of the United States Patent and Trademark Office*